March 28, 1961 J. C. RIEDEL 2,976,580
DEVICE FOR PREPARING A FLEECE, SLIVER OR
YARN, IN PARTICULAR OF GLASS
Filed July 16, 1953 2 Sheets-Sheet 1
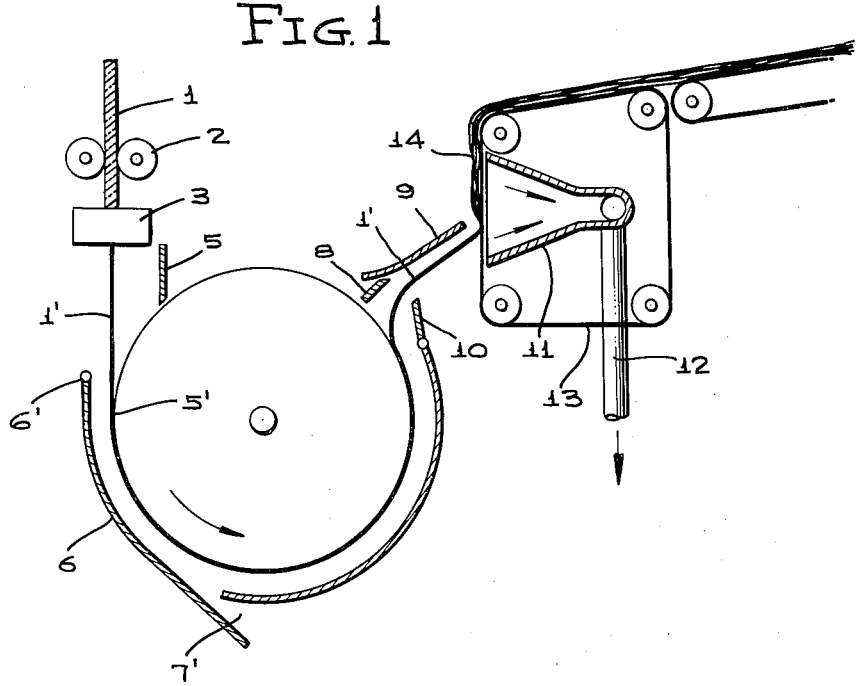
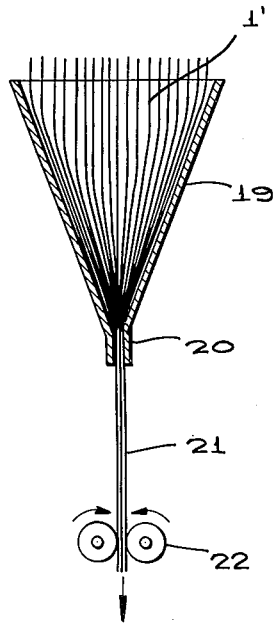
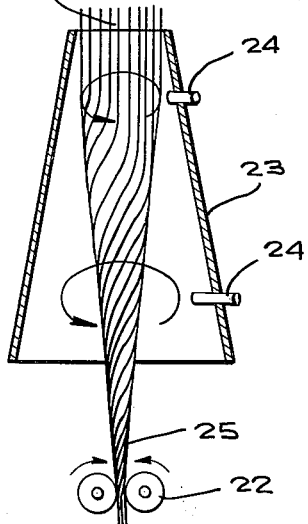
INVENTOR.
JOHANN CHRISTOPH RIEDEL

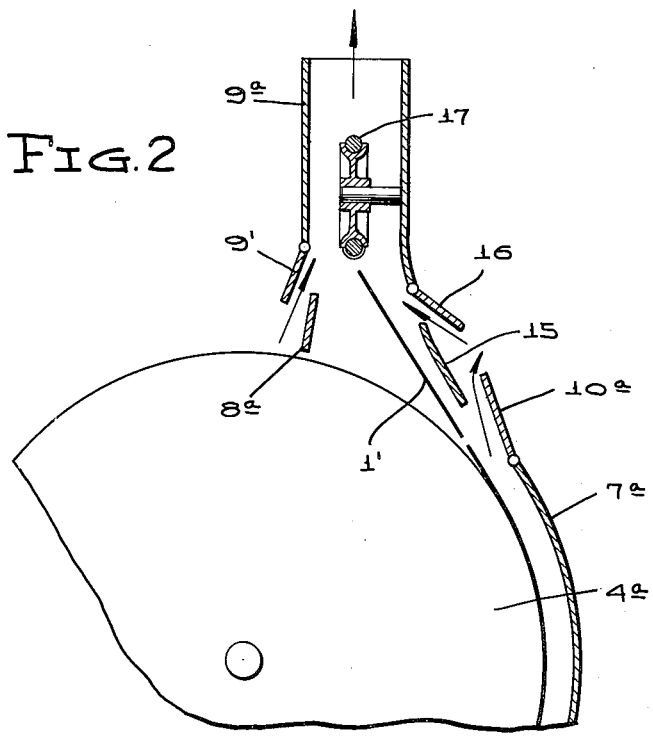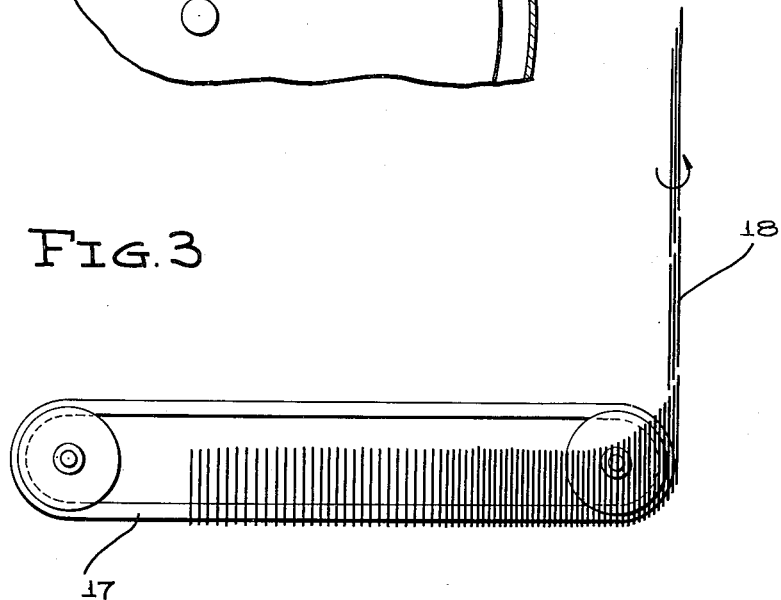

United States Patent Office 2,976,580
Patented Mar. 28, 1961

2,976,580

DEVICE FOR PREPARING A FLEECE, SLIVER OR YARN, IN PARTICULAR OF GLASS

Johann Christoph Riedel, Burggasse 4, Voitsberg, Austria

Filed July 16, 1953, Ser. No. 368,310

3 Claims. (Cl. 19—150)

Various processes have become generally known so far for preparing textile glass filaments or glass fibers.

Accordingly to one process, the filaments drawn from nozzles or from continuously extending rods melting off conveniently at one end are made to reel onto a rotating body. At the end of a working period, the fibre lengths thus formed are cut through and taken off the drum, and then worked further into a fleece or yarn.

With a second process, the so-called nozzle-drawing process, the filaments, which are drawn from nozzles and reeled upon a rotating body, called a primary bobbin, have to be unreeled again from said bobbin in order to obtain a silky glass yarn.

A third process, know as a blowing process, consists in having the filaments, which in a first stage are spun from the rods or nozzles continuously, torn by a steam current or the like, to collect them subsequently in the shape of fleece or yarn.

Finally there has been proposed a fourth process, wherein the filaments drawn by means of a rotary drum from melting substances, are dragged along only over part of the periphery of a drum, and the filaments are taken away from the drum periphery by means of a ruler closely bearing against said drum. In this way, contrary to the other processes mentioned, it is possible to prepare a fibre fleece or a strip of glass fibers in one operation, but it is obtained in entangled form, so that it is absolutely necessary, in order to obtain useful glass yarn, to add further operational steps and devices suited for same.

The present invention concerns a process and means, whereby the mentioned known processes are simplified to considerable extent and whereby moreover it becomes possible to obtain a directly utilizable sliver or yarn from unlimited lengths of silky glass fibers or from staple fibre glass of any length, in one single unbroken operation. The carrying out of this process has proved to be particularly economical, for the constructed embodiment of the devices to be used is extremely simple with their operation is very easy, and any further transport and dusting being avoided.

In accordance with the present invention, the filaments, in an uninterrupted operation, are drawn by a rotating drum (primary bobbin) from melting off rods or from melts issuing from nozzles, and dragged along by said drum and are lifted after short-lasting adhesion, sufficient for the continuous drawing, and detached thus from the drum periphery with the lifting and detaching of the filaments being effected by means of an air stream directed or blown against the direction of rotation of the drum (primary bobbin) over the periphery thereof, and with these filaments being fed to further treatment in freely flying conditions.

The freely flying filaments may then be collected in divided or undivided condition either to form fleece or yarn, and finally stopped.

If the air stream determining the lifting and detaching of the filaments, which stream is preferably formed by the very turning wind of the filament-draying body rotating rapidly, is merely stowed so that it suffices for detaching the filaments spun up, then the latter are obtained as endless long silky glass filaments.

But if to this stowed circumferential wind there is added an air stream blow at the spot of detaching, then the endless long silky filaments obtained initially are torn up to staple fibers. The staple length is adjusted by governing this additional blowing.

The device according to the invention involves the great advantage that the silky filaments or the staple fibers obtained are quite undamaged, are straightened and parallelized by the wind and can be stopped as a well-ordered fleece or yarn.

To form fleece the filaments or fibers thus parallelized are then sucked onto a support sweeping past and are collected and further processed by the latter. The application on a travelling support is carried out preferably by sucking the filaments or fibers floating in the wind onto a sieve-like support, which may be a tape or a drum. Where the sucking ceases, it is possible without difficulty to take off the filaments or fibers as a well-ordered fleece. The cohesion in the fleece is provided additionally by an adhesive used in a suitable manner. But it is also possible to blow the wind disseminated with filaments over a card wire band, whereby the fibers are retained and conveniently oriented if the card wire band is arranged as it should. In this case it is advantageous to use divided filaments. In both cases it is possible to align perfectly the filaments or fibers by means of the air stream carrying along said filaments and fibers.

To form yarn the filaments or fibers may be obtained preferably as silk yarn or as staple fiber sliver.

In the drawings there are represented diagrammatically by way of example some embodiments of devices for carrying out the process according to the invention, viz.:

Fig. 1 shows diagrammatically a device according to the invention for producing a fleece;

Figs. 2 and 3 show in two partial views a device whereby staple fibers are obtained;

Fig. 4 represents an arrangement for preparing a non-twisted silk yarn; and

Fig. 5 represents an arrangement for preparing a twisted silk yarn.

With reference to Fig. 1, the numeral 1 designates the filament-supplying glass rod, which by means of feed rolls 2 is fed continuously to the device 3 for heating to spinning plasticity. By means of a drawing-off drum 4 rotatable about its axis, the filament 1' spinning from the device 3 is drawn off. The drum 4 is rotated by means of a drive not shown in the drawing, with about 45 m./sec. peripheral speed. It will be understood that a number of glass rods 1 is provided corresponding to the length of the drum 4, which will draw off a corresponding number of filaments 1'. The drum 4 creates a circumferential wind due to its peripheral speed, which wind is suitably directed by means of the baffle plates 5, 6, 7, 8, 9 and 10.

The plates 6 and 7 guide the wind along the periphery of the drum 4. As visible in Fig. 1, between the plates 6 and 7 there may be provided an interstice 7', which is adjustable by means of angular displacement of the plate 6 about the axis 6'. The interstice 7' has the task of ejecting the drops that at the start of the operation detach from the tips of the glass rods 1 and dragging behind them the filaments 1', and moreover that of guiding the circumferential wind needed for further treatment and directed into the space between the plate 7 and the drum periphery. The plate 5 arranged in the direction of rotation of the drum 4 before the spinning-up point 5' for the filament 1', provides protection against the circumferential wind which is not desirable at this place. At a certain distance from the end of the blast guide plate 7 there is arranged the plate 8 substantially normal to the tangential direction of the periphery of the drum. The effect of the plate 8 which is of interest from the point of view of the invention, is to obtain in a direction contrary to the direction of rotation of the drum 4 along the periphery of the latter a stowing effect of the circumferential wind and thus to form an air cushion, by which the filaments 1' are detached from the drum surface without damaging or tearing them. Thus, an aerodynamic reaction is developed which is directed opposite to the tangential direction of movement of the drum. By means of the blast guide plates 10, the circumferential wind is lead off conveniently and is influenced as to direction by the plate 9. The filaments carried along by the lead-off circumferential wind, freely flying therein and straightened and parallelized thereby, can now be stopped in a suitable manner to form fleece or yarn.

In Fig. 1 there is shown an arrangement for fleece-forming stopping. It consists essentially of a source of depression, which in the present case is formed by the funnel 11, into which opens an aspiration conduit 12. The funnel 11 is open in front and by way of suitable guide rolls a filter tape 13 is fed past its opening. The glass filaments 1' coming from the drum 4 and carried by the lead-off circumferential wind as far as the filter tape 13, are deposited on said filter tape 13 by the suction effect of the source of depression 11. The slower the rotating of the filter tape, the thicker the coating 14 of glass filaments formed thereon. It is thus possible to obtain a fleece 14 of any thickness. This fleece offers the great advantage that it consists of accurately aligned parallel glass fibers, as required absolutely for various uses.

If however it should be desirable to obtain a glass fibre fleece entangled to any desired degree, this can be obtained as well without any difficulty by means of purposely caused air whirls.

In order to obtain a fleece with aligned filaments, continuous unbroken silky glass filaments are better suited, while for tangled fiber fleece staple glass fibers are better suited.

In Fig. 2 there is represented a partial view of the blast guide device at the point of detaching of the filaments from the drum 4a, which for the remainder is the same as the drum 4 shown in Fig. 1. Also with this embodiment of the device, there are provided blast guide plates 7a and 10a as well as the plate 8a causing the stowing effect as identical to the plates 7, 8 and 10 of Fig. 1. The blast guide plate 9a possesses an adjustable lid 9' which is, in effect, a part of the plate 9a. Between the lid 9' and the plate 8a there is an interstice through which, owing to the aspiration provoked, air can be sucked or additional blast can be introduced if needed. Subsequent to the plate 10a there are arranged a further plate 15 as well as a lid 16. Between the plates 10a and 15 as well as between the plate 15 and the lid 16 there are free interstices. The glass filaments, dragged along by the drum 4, are detached from the drum surface as a consequence of the stowing effect of the circumferential wind obtained by means of the plate 8a, as well as by effect of the partial deviation of the blast through the interstice between the plates 10a and 15. The air currents additionally sucked or let in through the interstice between the lid 9' and the plate 8a as well as through the interstice between the lid 16 and the plate 15, accelerate the original circumferential wind and thus cause a tearing of the filaments 1' about at the point at which they are detached from the drum periphery. In this manner staple glass fibers are obtained continuously. The length of these fibers is adjusted by means of the intensity of the blast acceleration, at will.

Into the off blast permeated by fibers, there is introduced a rotating tape 17, around which the fibers deposit perfectly straightened and whereby they are transported off—as shown in Fig. 3—from the device and then to be drilled in known manner directly into a sliver 18.

If a glass silk yarn is to be obtained, that is, a yarn of a number of endless long single glass filaments, the filaments 1' detached from the drum 4 undivided and ordered according to Fig. 1, are carried as visible in Fig. 4 by the off blast and guided directly into a funnel-shaped pipe 19. In the pipe 19 the blast is accelerated, whereby the filaments are drafted and at last drawn off from the opening 20 of the pipe 19 in the shape of non-twisted silky yarn 21 by means of the transport rolls 22. The filament count of the silky yarn 21 produced corresponds to the number of filaments spinning up the drum 4 (Fig. 1).

If a twisted silky yarn is to be obtained, then the filaments 1' obtained according to Fig. 1 are guided into a tubular body 23 (Fig. 5), into which by means of the feed ducts 24 there are introduced air streams in such a manner as to act tangentially upon the freely flying filaments 1', whereby a twist is imparted to them. The glass silk yarn 25, thus twisted, is drawn off by means of transport rolls.

What I claim is:

1. A device for forming a fleece, sliver or yarn from filaments of glass rods comprising a rotatable drum on which continuous filaments are deposited to be drawn off by the rotation of the drum from a source, inlet and outlet guide plates disposed concentric to the drum around a portion of the circumference thereof and radially spaced therefrom to guide the wind of filaments along the periphery of the drum, a baffle plate mounted normal to the tangential direction of the periphery of the drum and spaced from the periphery thereof and arranged transversely of the wind of filaments and spaced circumferentially of the drum from the discharge end of the outlet guide plate and a guide plate disposed at the outer end of the baffle plate and spaced therefrom and forming a guide prolongation thereof, said drum producing upon rotation an air stream over the faces of the baffle plate and guide plate facing the outlet guide plate and moving radially outward from the periphery of the drum to strip the filaments from the drum without damaging the filaments and filament collecting means arranged at the outer end of said guide plate.

2. In a device for forming a fleece, sliver or yarn from filaments of glass rods, a rotatable drum on which filaments are deposited from a feed means to be drawn off by the rotation of the drum from the feed means, guide means arranged concentric to the drum around a portion of the circumference thereof and radially spaced therefrom and having an inlet and an outlet end, and a baffle plate mounted normal to the tangential direction of the periphery of the drum and spaced from the periphery thereof and arranged transversely of the wind of filaments in spaced confronting relation with the outlet end of the guide means to enable the circumferential wind created by the rotating drum to be stowed and flow over the face of the baffle plate confronting the outlet end of the guide means for stripping the filaments from the periphery of the drum and a guide plate disposed at the outer end of the baffle plate and spaced therefrom to provide an air inlet interstice therebetween, said guide plate forming a guide prolongation of the baffle plate.

3. In a device for forming a fleece, sliver or yarn from filaments of glass rods, a rotatable drum on which filaments are deposited from a feed means to be drawn off by the rotation of the drum from the feed means, guide means arranged concentric to the drum around a portion of the circumference thereof and radially spaced therefrom and having an inlet and an outlet end, and a baffle plate mounted normal to the tangential direction of the periphery of the drum and spaced from the periphery thereof and arranged transversely of the wind of filaments in spaced confronting relation with the outlet end of the guide means to enable the circumferential wind created by the rotating drum to be stowed and flow over the face of the baffle plate confronting the outlet end of the guide means for stripping the filaments from the periphery of the drum and a guide plate disposed at the outer end of the baffle plate and having an inner end overlapping in spaced fashion the outer end of the baffle plate to create an air inlet interstice therebetween, said guide plate forming a guide prolongation of the baffle plate and means adjustably mounting the guide plate so that the size of the air inlet interstice is adjustable.

References Cited in the file of this patent

UNITED STATES PATENTS

| | | |
|---|---|---|
| 2,194,728 | Von Reis | Mar. 26, 1940 |
| 2,460,899 | Modigliani et al. | Feb. 8, 1949 |
| 2,621,444 | Schuller | Dec. 16, 1952 |

FOREIGN PATENTS

| | | |
|---|---|---|
| 965,189 | France | Feb. 15, 1950 |
| 605,000 | Great Britain | July 14, 1948 |
| 628,145 | Great Britain | Aug. 23, 1949 |